United States Patent [19]
Durot et al.

[11] Patent Number: 4,707,252
[45] Date of Patent: Nov. 17, 1987

[54] FLUID BED REACTOR FOR THE BIOLOGICAL TREATMENT OF WATER

[75] Inventors: Jean Durot, Villepreux; Claude Prevot, Ville d'Avray, both of France

[73] Assignee: Societe Degremont, Rueil Malmaison, France

[21] Appl. No.: 891,629

[22] Filed: Aug. 1, 1986

[30] Foreign Application Priority Data

Aug. 9, 1985 [FR] France .................. 85 12236
Jul. 1, 1986 [FR] France .................. 86 09523

[51] Int. Cl.$^4$ .............................................. C02F 3/08
[52] U.S. Cl. .................................. 210/151; 210/188; 210/189; 210/197; 210/265; 210/618
[58] Field of Search ............... 210/150, 151, 197, 207, 210/209, 218, 188, 189, 265, 617, 618, 661, 786

[56] References Cited

U.S. PATENT DOCUMENTS

| | | | |
|---|---|---|---|
| 4,009,099 | 2/1977 | Jeris | 210/151 |
| 4,202,774 | 5/1980 | Kos | 210/274 |
| 4,390,422 | 6/1983 | Mackrle et al. | 210/188 |
| 4,482,458 | 11/1984 | Rovel et al. | 210/150 X |
| 4,498,985 | 2/1985 | Atkinson et al. | 210/151 |
| 4,530,762 | 7/1985 | Love | 210/188 X |
| 4,618,418 | 10/1986 | Heijnen et al. | 210/151 |

FOREIGN PATENT DOCUMENTS 0090450 10/1983 European Pat. Off. .
8409235 12/1985 France .

*Primary Examiner*—Tom Wyse
*Attorney, Agent, or Firm*—Sandler & Greenblum

[57] ABSTRACT

A reactor for aerobically or non-aerobically treating a fluid flowing from the bottom to the top of the reactor through a fluidized bed of granular material. The reactor includes a base having an orifice therein, through which fluid flows into the reactor and in which gas is added to the fluid. A horizontally extending plate surrounded by a supple membrane faces the base and the orifice. The plate and the membrane form a valve for preventing fluid from the reactor from entering the orifice in the event fluid flow into the reactor ceases. The gas entrains the granular material so that when the gasified fluid passes upward through the granular material a three-phase liquid-gas-granular material mixture is produced. The upper portion of the reactor includes a device for disembedding the granular material from the fluid, a device for degasing the three-phase liquid-gas-granular material mixture, and a device for separating the granular material from the fluid to produce a fluid discharge. The separation device also recycles the granular material into a fluidization zone. Also provided is a device for recycling and recuperating the fluid discharge into the fluidization zone of the reactor, thereby fluidizing the bed of granular material.

32 Claims, 9 Drawing Figures

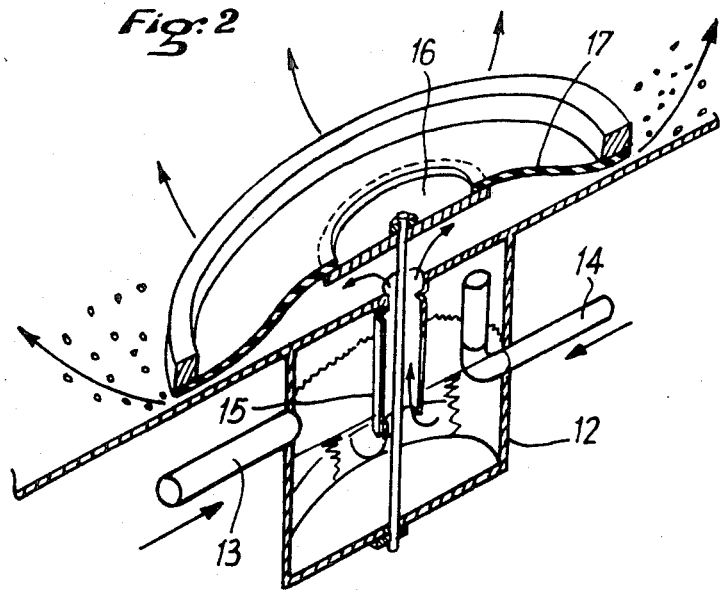
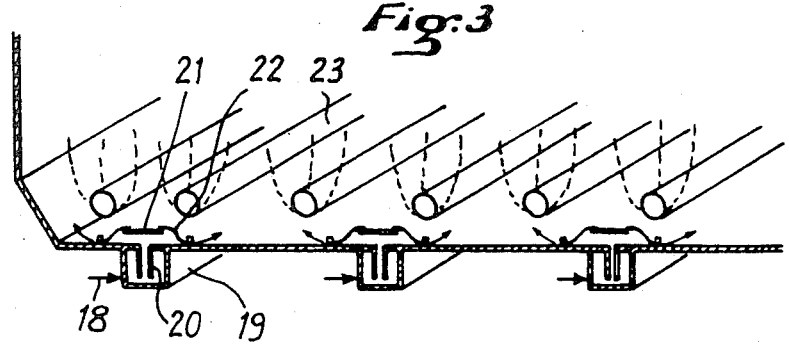
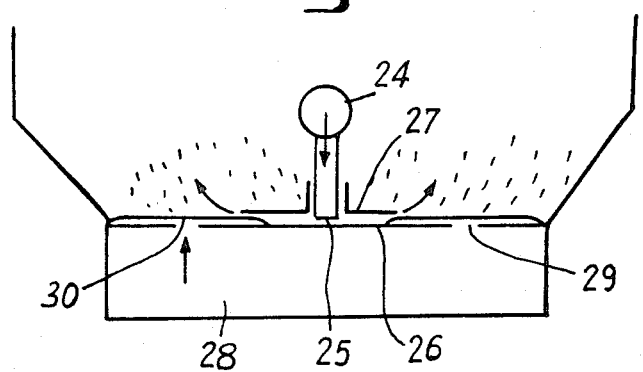

FLUID BED REACTOR FOR THE BIOLOGICAL TREATMENT OF WATER

CROSS-REFERENCE TO RELATED APPLICATION

Reference is made to related application U.S. Ser. No. 835,747 filed Apr. 18, 1986, still pending, which is hereby incorporated by reference.

BACKGROUND OF THE INVENTION

1. Field of the Invention

The invention relates to fluid bed reactors having granular material therein, which are used to biologically treat fluids, such as water, by aerobic or non-aerobic means, and in which the fluid to be treated flows from the bottom towards the top of the apparatus.

2. Description of Pertinent Information

It is well established that biological field bed reactors have numerous advantages over traditional reactors using free or immobilized cultures positioned on fixed beds. These advantages include: better contact between the water to be filtered and the bacterial mass, and retaining superior charge volumes by virtue of the very large specific surface area of the granular material.

Numerous reactors of this type have been developed. However, all of these prior art reactors have disadvantages which include difficulty in ensuring the introduction and homogeneous distribution of fluids into the granular material bed, as well as difficulty in disembedding, separating, and recycling the granular material.

Several reactors partially compensate for some of these disadvantages. For example, U.S. Pat. No. 4,202,774 and European Pat. No. 0,090,450 both describe a reactor using a plurality of devices for injecting the liquid to be treated through feeding orifices at several points along the base of the reactor. However, in these reactors there is the risk that these feeding orifices can become obstructed. In addition, there is no gas introduced into the reactor itself. Rather, the treating gas is generally mixed with the liquid to be treated before the introduction of the liquid into the reactor.

French Pat. No. 84.09235 to Applicant relates to a reactor using a fluid bed in which the water to be treated is introduced at a high speed into a layer of granular material, thereby transfering this water into a second layer of material which is rendered fluid. The granular material is washed and recycled in this second layer by means of a device attached to the exterior of the reactor.

However, known reactors such as those described above are not well suited for a three-phase mix comprising: the liquid to be treated; a treatment gas, such as air, oxygen, oxygen enriched air, or gas formed in the reactor such as methane; and the granular material. Thus, there is a need for a reactor that is well adapted to treat the three-phase mix as described above. There is also a need for a reactor that can produce a homogeneous distribution of fluids into the granular material bed, and that can easily and efficiently disembed, separate, and recycling the granular material.

SUMMARY OF THE INVENTION

It is an object of the present invention to provide a reactor for treating a fluid by biological means which is well suited to use a three-phase mix comprising the liquid to be treated, a treatment gas, and granular material.

It is another object of the present invention to provide a reactor having granular material therein, in which the aerobic or non-aerobic biological treatment of a fluid is effected, and in which the difficulties in introducing and producing a homogeneous distribution of fluid therein are remedied, and in which the difficulties in fluidizing the granular material, degasing, disembedding, separating and recycling of the treated effluent are remedied.

The invention which achieves these objectives relates to a reactor for aerobically or non-aerobically treating a fluid. The reactor comprises: means for introducing the fluid into the reactor; a bed of granular material in the reactor; and means for adding gas to the fluid in the reactor. The gas entrains the granular material so that when the gasified fluid passes through the bed of granular material a three-phased liquid-gas-granular material mixture is produced. In addition, the reactor comprises a fluidization zone in which the bed of granular material is fluidized, and an upper portion. The upper portion comprises means for disembedding the granular material entrained by the gas from the fluid, means for degasing the three-phase liquid-gas-granular material mixture, means for separating the granular material from the fluid to produce a fluid discharge, and means for recycling and recuperating the fluid discharge into the fluidization zone, thereby fluidizing the bed of granular material. The separation means comprises means for recycling the granular material into the fluidization zone.

The reactor further comprises a lower portion comprising the fluid introduction means, the bed of granular material, and the gas adding means.

The separating means comprises means for decanting the fluid from the granular material. In addition the reactor further comprises: means for causing the fluid to flow from the bottom to the top of the reactor; a base comprising the fluid introduction means such that the fluid introduction means comprises at least one orifice through which the fluid passes; and at least one substantially horizontally extending plate comprising a supple membrane. The membrane comprises a valve.

The plate and the membrane are positioned above the base, and the membrane and the plate comprise a valve for preventing fluid in the reactor from flowing into the orifice in response to the cessation of fluid flow into the reactor through the orifice.

The plate comprises two longitudinal ends and a bottom face. The membrane extends from each longitudinal end of the plate, and the orifice faces substantially vertically and substantially perpendicular with respect to the bottom face of the plate, whereby fluid flowing from the orifice into the reactor flows substantially vertically until the fluid contacts the plate, so that the fluid flows substantially horizontally after contacting the plate.

The fluid introduction means comprises an entrance channel comprising a vertically and axially extending neck for guiding the fluid in the substantially vertical direction against the plate. In addition, the plate is surrounded by the membrane.

The entrance channel further comprises first and second openings therein. The fluid introduction means further comprises a fluid channel adapted to be attached to source of fluid, and passing through the first opening. The reactor further comprises a gas channel attached to a source of gas and passing through the second opening. In one embodiment the diameter of the neck is between 20 and 300 millimeters.

The neck comprises a plurality of orifices adapted to receive the gas. The diameter of the orifices in the neck is such that the neck comprises means for equally distributing the loss in energy of the gas as the gas passes through the orifices in the neck. The diameter of the orifices is between approximately 30 and 300 millimeters.

The membrane is so shaped as to comprise means for ejecting the fluid into the reactor above and to the side of the membrane at a speed of between approximately 1 and 5 meters per second.

The granular material has a greater density than water, between approximately one and two times the density of water. In addition, the diameter of the granular material is between approximately 0.1 and 5 millimeters.

In one embodiment the granular material comprises two different granular materials having different dimensions and densities.

One end of the fluidization zone is adjacent the disembedding means and one end of the disembedding means is connected to the degasing means. The fluid flows downwardly from the disembedding means into the degasing means. In this embodiment the reactor further comprises a biomass on the granular material, and means for producing a speed of the fluid and the granular material in the disembedding means sufficient to eliminate excess biomass on the granular material in the degasing means when the fluid travels downwardly through the degasing means.

In one embodiment the reactor further comprises: means for producing a speed of the fluid in the fluidization zone of between approximately 2 and 20 m/h; means for producing a speed of the fluid and the granular material in the disembedding means of between approximately 0.1 and 1 m/sec; means for producing a speed of the fluid in the degasing means of less than 1 cm/second; and means for producing a speed of the granular material in the recycling means of between approximately 0 and 2 meters/second.

In still another embodiment the reactor has a cylindrically shaped upper portion, and the disembedding means comprises a tube extending upwardly from the fluidization zone and extending out of the reactor. One end of the tube is connected to the fluidization zone. The other end of the tube is connected to the degasing means. The degasing means comprises a first chamber in the reactor, and the reactor further comprises a first partition separating the first chamber from the fluidization zone. The first chamber is taller than the level of fluid therein. In addition, the degasing means further comprises a tube at the top of the first chamber for carrying off the gas separated from the fluid in the first chamber. The tube in the first chamber is connected to the gas adding means. The first partition is slanted downwardly from one side of the reactor, and the reactor further comprises a second partition and a second cylindrical coaxial chamber, coaxial with the cylindrically shaped upper portion of the reactor. The second partition separates the first chamber from the second cylindrical coaxial chamber. The second chamber is positioned substantially in the center of the reactor, and the second chamber comprises the separation means. In this embodiment the reactor further comprises a funnel-shaped element and a discharge tube for carrying the discharged fluid out of the reactor. The funnel shaped element is positioned at one end of the tube in approximately the center of the second chamber substantially above the bottom of the second partition. The second chamber comprises a decantation enclosure comprising a bottom portion comprising a recycling tube extending downwardly from the decantation enclosure and comprising the recycling means.

In still another embodiment the fluid introduction means comprises a plurality of injection necks mounted on the plate. The fluid is injected into the reactor through the neck. In this embodiment the reactor further comprises a plurality of gas collectors positioned above the plate. The plurality of gas collectors each comprise a plurality of orifices for the diffusion of the gas. Each gas collector is associated with one of the injection necks. The invention also relates to such a reactor in combination with the gas, wherein the gas comprises a material selected from the group consisting of: air, oxygen, and oxygen enriched air.

In still another embodiment the fluid introduction means comprises a plurality of nozzles comprising means for equally distributing the fluid in the reactor. Each nozzle comprises an orifice for producing a jet of the liquid directed at the plate. In this embodiment the reactor further comprises a bottom wall comprising the plate, and the membrane comprises a ballasted supple membrane comprising the valve. Also, the reactor further comprises a plurality of air diffusing devices, each of which are associated with one of the nozzles. Each air diffusing device comprises an air tank positioned under the associated injection nozzle, and each tank comprises a plurality of orifices comprising means for distributing the air equally in the reactor. Also each tank further comprises a plurality of supple membranes, each of which surrounds one of the orifices and each of which comprises a material selected from the group consisting of: perforated material and porous material. The orifices of the nozzles have a diameter between approximately 20 and 100 millimeters.

The disembedding means can comprises a regulatable diaphragm, and one of the following: at least one interior transfer tube inside the reactor; and at least one exterior transfer tube extending outside the reactor. Also the disembedding means comprises means for producing a fluid flow in the disembedding means of between approximately 0.1 and 1 meters per second.

The degasing means comprises one of the following: at least one central enclosure extending through the center of the reactor; and at least one lateral enclosure. Also, the degasing means comprises means for producing a descending hydraulic flow of between approximately 0.3 and 5 centimeters per second.

The reactor further comprises a reaction zone in which the fluid mixes with the granular material and the gas. In addition, the separation and decanting means comprises a lower portion comprising a truncated bottom having a cross-sectional area between approximately 0.5 and 3 times the cross-sectional area of the degasing means. The truncated bottom comprises at least one tube for recycling the granular material into the reaction zone. In addition, the separating and decanting means further comprises an upper portion comprising one of the following: at least one central enclosure extending through the center of the reactor; and at least one lateral enclosure.

The gas adding by the gas added means causes a gas-lift effect in the reaction zone and in the degasing means. Also, the tube of the lower portion of the separation and decanting means further comprises means for conveying at least a portion of the fluid discharge for fluidization of the granular material in response to the gas-lift effect in the reaction zone and in the degasing means. This portion of the fluid discharge comprises a recycling discharge, and the reactor in this embodiment further comprises means for controlling the recycling discharge. The control means comprises means for permitting a permanent flow of the recycling discharge and for permitting a sequential interrupted flow of the recycling discharge.

The separating and decanting means comprises a decantation zone in which decantation of the granular material and the fluid occurs. The tube comprises an opening therein, and the reactor further comprises a rotatable organ whose speed of rotation is adapted to be regulated. The organ is positioned in one of following locations: in the opening in the tube; and in the interior of the tube. As a result, the organ comprises means for reinforcing the disembedding of the granular material in the disembedding means and for controlling the flow of the recycling discharge at the bottom of the decantation zone and the recycling of the granular material in the reaction zone.

The organ positioned in the tube has a generally cylindrical shape. Alternatively, the organ in the tube has substantially the shape of a screw having threads which extend to the end of the screw. In this embodiment the reactor further comprises a cutting grill positioned in the tube and adapted to engage the organ. In still another embodiment the organ positioned in the opening of the tube comprises a substantially conical wheel having at least one helicoidal groove thereon or a plurality of helicoidal grooves thereon. In addition, the reactor can comprise means for rotating the organ between approximately 10 and 200 t/minute. Also, the organ has a diameter of approximately between 100 and 400 millimeters.

BRIEF DESCRIPTION OF THE DRAWINGS

The invention will now be described in more detail in the detailed description that follows in which the invention is described in non-limiting examples, the details of which can be varied without going beyond the scope of the invention, with reference to the attached drawings in which:

FIG. 2 is an enlarged perspective schematic view of the bottom portion of the reactor illustrated in FIG. 1;

FIG. 3 is a schematic view of another embodiment of the present invention;

FIG. 4 is a schematic cross-sectional view of another embodiment of the present invention showing means for introducing fluids into the reactor;

DETAILED DESCRIPTION OF PREFERRED EMBODIMENTS

Figure 1:
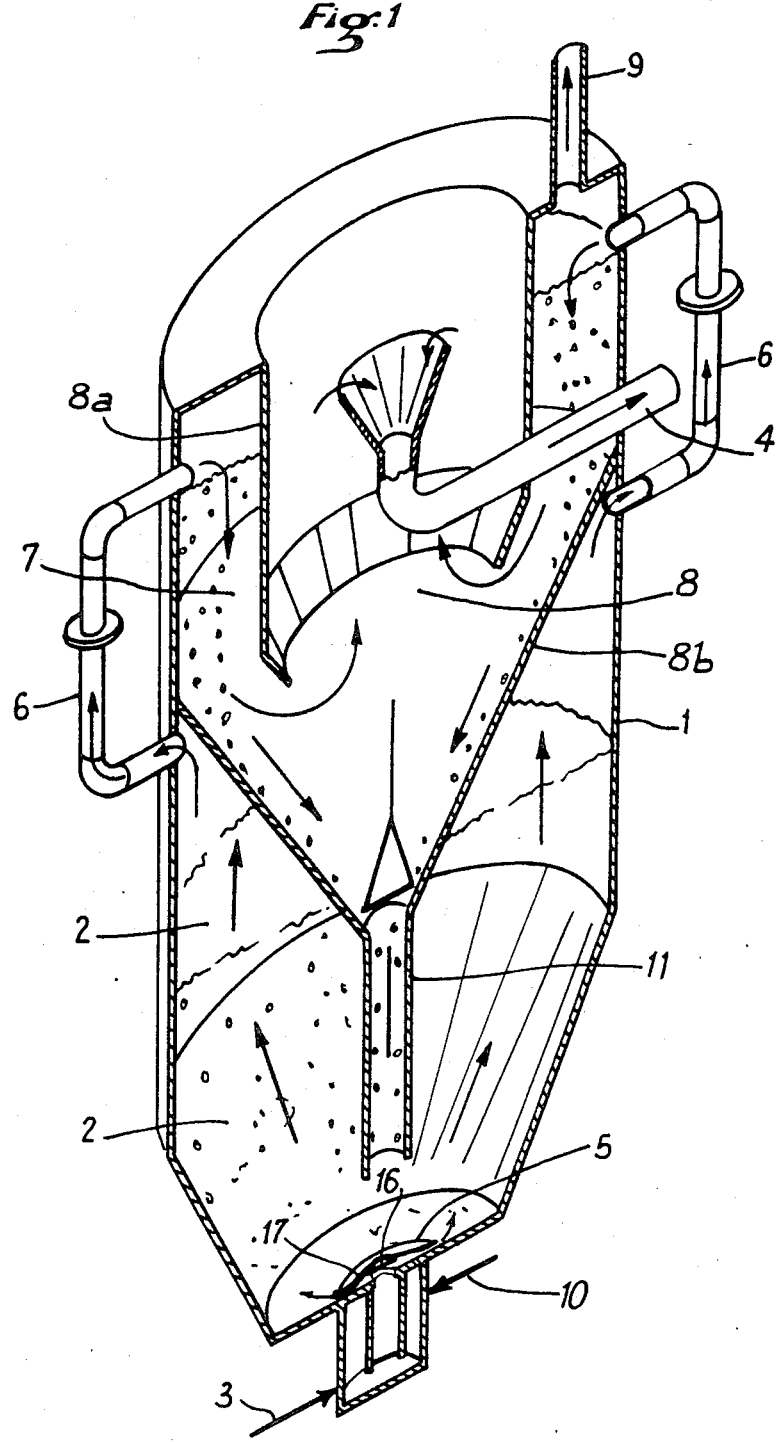
FIG. 1 is a perspective view of one embodiment of the present invention.

The present invention is well suited to provide a reactor that biologically treats fluids by using a three-phase mixture: the fluid to be treated, a treatment gas, and granular material. The treatment gas is provided to provoke turbulence to lighten the granular particles and to create a "gas-lift" effect in the reactor, which aids in the treatment and recycling of the fluid and granular material.

The present invention comprises a reactor having a granular material fluid bed. Liquid to be treated by aerobic or non-aerobic means flows from the bottom to the top of the reactor across the granular material bed. The reactor further comprises a base, and means for introducing the fluid or fluids into the base of the reactor. This means comprises at least one introduction orifice through which the fluids are introduced in the form of a fluid jet. This means also comprises at least one horizontal plate on which a supple membrane is attached. The membrane and plate together form a valve for releasing the jet of fluid into the reactor. The reactor also comprises means for introducing a treatment gas into the reactor which lifts the granular material into the upper portion of the reactor. In addition, the upper portion of the reactor comprises means for effecting the disembedding of the granular material from the liquid. Also provided are means for degasing the liquid and the three-phased mixture, means for separating by decantation the granular material, means for recycling this decanted granular material in a fluidization zone of the reactor, and means for recycling the liquid discharge in the fluidization zone, thereby assuring the fluidization of the treated liquid and assuring the recovery of the treated liquid.

In one embodiment the means for introducing fluids into the base of the reactor comprises at least one input opening comprising a vertically disposed axially extending neck, and a horizontal deviation plate surrounded by a supple membrane. The plate and membrane together form a valve as will be described in more detail below. The neck guides the flow of liquid against the plate so that the fluid flow changes from substantially vertical to substantially horizontal until the fluid passes beyond the membrane when the fluid then flows upward to the top of the rector. The neck preferably comprises a plurality of orifices through which a treatment gas is introduced via this input opening.

This embodiment is preferably used in a non-aerobic treatment of the liquid. In this embodiment the reactor has a generally cylindrical shape with a truncated bottom up to 3-4 millimeters in diameter, and comprises a single opening for the injection of fluid. Alternatively, the reactor can comprise a flat bottom having a plurality of openings therein for the injection of fluid into the reactor.

In an alternative embodiment specifically adapted to aerobic reactors with flat bottoms, the input or injection openings comprise an injection neck mounted on a horizontal deviation plate. The plate causes the course of the jet of liquid to deviate from its vertical course to a substantially horizontal course in order for the liquid jet to pass around the plate. The plate is equipped with a supple membrane. In addition, the reactor further comprises a plurality of gas collectors, each having orifices adapted to permit diffusion of gas, air, oxygen, or oxygen enriched air. These collectors are positioned above the horizontal plate for causing deviation of the path of the liquid jet. As a result of this structure, the aerated liquid will not return to the injection opening, thereby preventing any carbonate encrustation at the injection opening. Further, the air lift created by the gas emitted by the collectors above the plate assures the homogeneous stabilization of the hydraulic flux of the liquid, thereby permitting the use of a small number points at which the liquid is introduced into the reactor.

In still another embodiment the means for introducing fluids at the base of the reactor comprises a plurality of nozzles for equally distributing the liquid to be treated into the reactor. Each nozzle comprises an orifice. The nozzle directs the liquid vertically onto a horizontal plate. The orifices are protected by a deformable, supple membrane which is attached to the bottom of the reactor in an air-tight manner in the event that the flow of fluid is interrupted, thereby acting as a valve to prevent any return flow into the fluid or the material. The liquid introduction nozzles are associated with an apparatus for the diffusion of air. This apparatus comprises tanks of air positioned on the bottom of the injection nozzles. The tanks comprise a plurality of orifices that are spaced apart by the same distance, and perforated or porous, supple membranes, which assure the diffusion of air in the form of very fine bubbles, at the point at which the liquid is injected into the reactor.

In another embodiment the means for disembedding of the granular material from the liquid which was caused by the gas, the means for degasing the three-phased mixture, and the means for separating by decanting the granular material from the liquid to be treated, comprise three successive enclosures of well defined dimensions positioned at the upper portion of the reactor, and in which the speed of the fluid is regulated and controlled.

The first such enclosure comprising the means for disembedding comprises at least one transfer tube having a regulatable diaphragm or diaphragms which create a laminating effect. This tube can be positioned in the interior or on the exterior of the reactor. Also provided are "deprimogeneous" devices for inducing turbulence in the transfer tube which facilitates the coalescence of the gas bubbles and/or the elimination of excess biomass on the granular material. This tube is so constructed that the speed of the fluids in this tube or these transfer tubes, which function as a gas-lift, is preferably between 0.1 and 1 meter/sec.

The second such enclosure comprising the means for degasing the three-phase mixture is positioned in the center of on the periphery of the upper part of the reactor. This flow of fluid in this enclosure has a decreasing hydraulic flux. In addition, this enclosure has a cross-sectional area that is wider than the first enclosure. The second enclosure is so constructed that the flow of water or fluid from the top to the bottom of this enclosure is lower than 5 cm/sec, and is preferably between 0.3 and 1 cm/sec. The gas that escapes from the upper part of the degasing enclosure is recuperated or recovered and eventually partially recycled at the base of the reactor by recovery and recuperation means.

The third such enclosure comprising the means for separating the granular material from the liquid by decantation is positioned at the center fo the upper part of the reactor, or it is positioned on both sides of the degasing enclosure. The cross-sectional surface area of this third enclosure is 0.5–3 times the cross-sectional surface area of the degasing enclosure, depending upon the type of treatment to be performed on the liquid is aerobic or non-aerobic, and the composition of the liquid to be treated. The lower part of this third enclosure comprises a truncated bottom which concentrates the decanted material and allows for the speedy evacuation of the decanted material. The lower part of the third enclosure is connected to a reaction zone in which the three-phase fluid mix is found. The lower part of the third enclosure is connected to this reaction zone by at least one recycling tube which assures the recycling of the granular material in a fluidization zone and which assures the necessary discharge of the fluid.

The apparatus of the present invention permits an increase, by 20%–200% compared to prior art reactors, in the amount of granular material that can be used to treat the liquid by using the natural recycling induced by the "gas-lift" effects created by the difference in density between the three-phase medium in the reaction zone, and the two-phase medium in the transfer tubes generated after degasing.

The embodiment illustrated in FIG. 1 shows a reactor 1 according to the present invention. Reactor 1 has a generally cylindrical upper portion and a generally conical lower portion. Reactor 1 comprises a fluid bed of granular material across which the fluid or liquid to be treated in the reactor is forced to circulate from the bottom to the top. In addition, the gas that is generated during treatment in the reactor also travels across this bed from the bottom to the top of the reactor. This fluidized bed of granular material is positioned in a fluidization zone 2 in the bottom portion of reactor 1.

The reactor is adapted to treat water or other fluids. The fluid to be treated is introduced into the apparatus by channel 3 at the base of reactor 1. The treated fluid, called the fluid discharge, exits the reactor by channel 4.

A means 5 of introducing the fluids such as water, and the gas, is positioned at the base of the reactor. When the gas is added to the fluid to be treated, and this gasified fluid passes through the fluidized bed a three-phase mixture is formed which comprises: the fluid to be treated (such as water), a gas, and the granular material.

Each grain of the granular material has a density greater than that of the water, preferably between one and two times the density of water. In addition, each grain of the granular material has an effective size between approximately 0.1 and 5 millimeters. In one embodiment one particular type of granular material is used. However, it is within the scope of the present invention to use two different granular materials together having different granular dimensions and having suitable densities. These different granular materials can be rendered fluid in a mixture or can be formed into a double layer to obviate difficulties in producing stability of the bed due to the rising of the balls of gas. The reactor is so constructed as to comprise means for producing an upward speed of the fluid and granular material in fluidization zone 2 between approximately 2 and 20 m/h. This speed is a function of the composition of the treated fluid or water and of the gas discharge which is injected into the apparatus.

The three-phase mixture in the upper part of the fluid bed is conveyed to the upper portion of the reactor by transport tube or tubes 6. Tubes 6 comprise an enclosure for disembedding the granular material from the fluid to be treated. The cumulative speeds of the water and gas in tubes 6 are between approximately 0.1 and 1 m/sec. This speed is sufficient to assure the elimination of excess biomass attached to the granular material in a degasing means comprising a degasing enclosure 7 positioned in the upper part of the reactor by means of a descending hydraulic flux.

Degasing enclosure or chamber 7 is positioned between fluidization zone 2 and a separating and decanting section or enclosure or or chamber 8. Partitions separate enclosure 7 from zone 2 and chamber 8. Chamber 7 has a very large width which is larger than the width of any other section of the reactor. The width of enclosure 7 at the upper portion of enclosure 7 between the two partitions separating chamber 7 from zone 2 and chamber 8 is equal to the width of the entire reactor. In degasing enclosure 7 the speed of a fluid such as water is generally lower than 1 cm/sec, although it can be between 0.3 and 5 cm/sec. The speed of less than 1 cm/sec allows a water/granular material mixture to reach separation and decantation enclosure 8. Decantation enclosure 8 comprises a cylindrical coaxial section 8a, which is coaxial with the reactor. Degasing enclosure 7 further comprises a channel 9 positioned in the top of enclosure 7 for carrying the gas added to the fluid out of the reactor. Gas flowing through channel 9 is eventually recycled by attaching channel 9 to channel 10 at the base of the reactor. Gas is added to the fluid in the reactor via channel 10.

In a preferred embodiment the granular material recuperated from decantation enclosure 8 can be extracted and recycled by an exterior pumping system to a reaction zone in which the gasified fluid mixes with the granular material to form the three-phase mixture. Decantation enclosure 8 is equipped with a natural recycling tube 11 which extends downwardly from a conical section 8d of enclosure 8 so as to guide the granular material toward the reaction zone. Tube 11 is equipped with control means for controlling the flow of fluid discharge that is recycled through tube 11 into the reaction zone. Recycling of the fluid discharge is due to "gas-lift" effects in the reaction zone and in transfer tubes 6. The speed of the fluid and the granular material in tube 11 is limited to between approximately 0 and 2 m/sec.

As FIG. 2 illustrates, means 5 for introducing the fluids into the reactor comprises an entrance chamber 12. Chamber 12 has two openings therein. One opening receives a channel 13 through which fluid such as water to be treated flows. The other opening receives a channel 14 which is connected to a source of gas. Chamber 12 is equipped with an axially and substantially vertically extending neck 15. Neck 15 has a diameter, for example, between approximately 20 and 300 millimeters. Neck 15 is perforated with calibrated orifices (not shown) for the injection of the gas into the fluid. The jet of fluid discharged from neck 15 encounters a substantially horizontally disposed plate 16 which causes the fluid to deviate from its substantially vertical path out of neck 15. Plate 16 also comprises a supple membrane 17 which extends from each side of plate 16 to surround plate 16. Membrane 17 forms a valve assuring that the system is water-tight. The supple membrane surrounds the horizontal plate and is ballasted by the edges in such a way as to assure a desired speed of the ejection of the fluid mixture of between approximately 1 and 5 m/sec. In the event that flow of the fluid into chamber 12 is interrupted, membrane 17 acts as a valve and rests in a water tight fashion on the bottom of the reactor, thereby preventing any penetration of the granular material or fluid in the reactor into the system and into chamber 12.

The distance that the horizontal plate is displaced above neck 15 is adjustable as a function of the discharge desired.

The gas introduction orifices in injection nozzle 15 are positioned and sized in such a way as to create a loss of energy in the gas as the gas passes into nozzle 15 that is equally distributed to the fluid. The orifices in the nozzle are preferably between 30 and 300 millimeters in diameter.

According to the embodiment illustrated in FIG. 3 the fluid, such as water, to be treated is introduced by channels 18 into chambers 19 by axially extending necks 20. The jets of fluid transmitted out of necks 15 encounters substantially horizontally extending plates 21 surrounded by supple membranes 22. The functioning of this embodiment is the same as that described with respect to FIG. 2.

Each introduction chamber 19 (which introduces a fluid such as water, to be treated into the reactor) is associated, by the formation of the three-phase mixture with an air or gas collector 23. Each air or gas collector comprises, as is known, orifices with a deformable membrane to permit the diffusion of gas therethrough. Each air collector is positioned above one of chambers 19. This arrangement avoids any return of the aerated fluid or water into chamber 19, thereby preventing the encrustation of carbonate deposits. Furthermore, the "air-lift" effect created by collector 23 above the horizontal plate assures a homogeneous stabilization of the hydraulic fluxes, thereby permitting the use of only a limited number channels for introducing fluid into the reactor.

In the embodiment illustrated in FIG. 4, the means for introducing the fluid or water to be treated comprises a plurality of collectors equipped with nozzles 24 for equally distributing the fluid in the reactor. Each nozzle comprises an orifice 25 having a diameter preferably between approximately 20 and 100 millimeters. Orifices 25 produce a fluid jet which is directed onto a horizontal plate which can comprise the bottom 26 of the reactor. Orifices 25 are covered by a supple membrane 27 which forms a valve. The means for introducing fluid or water to be treated into the reactor is associated with one or several air trunks 28 positioned underneath injection nozzles 24. Trunks 28 each comprise calibrated orifices 29 for equally distributing the air into the fluid. Each orifice 29 has a diameter preferably between approximately 3 and 20 millimeters. Each orifice 29 is equipped in known fashion with a porous or perforated elastic membrane 30.

Figure 5:
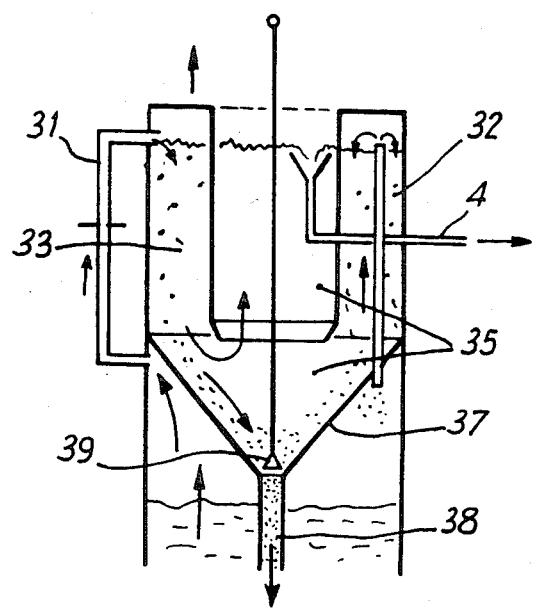
FIGS. 5 and 6 are schematic cross-sectional views of two additional embodiments of the upper part of the reactor of the present invention.
Figure 6:
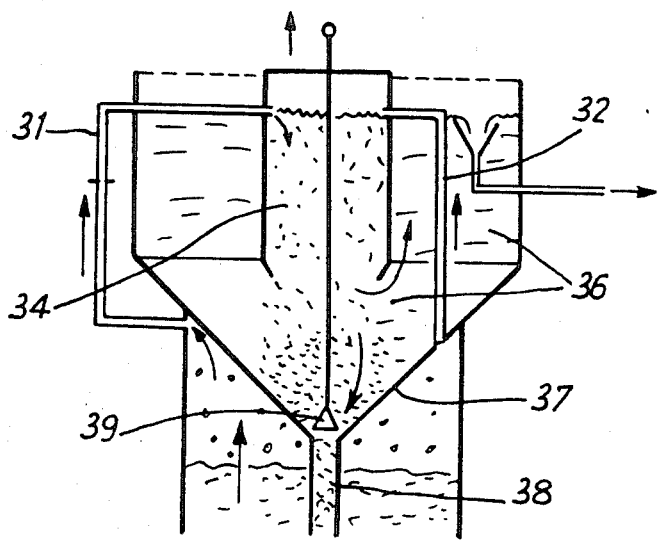

In the embodiment illustrated in FIGS. 5 and 6 the upper portion of the reactor comprises three enclosures or means: an enclosure or means for disembedding the granular material from the fluid comprising exterior 31 or interior 32 transfer tubes; a second enclosure or means for degasing the fluid comprising either a central 34 or lateral 33 enclosure; and a decanting enclosure or means comprising either a central 35 or lateral 36 enclosure. The bottom portion of the decanting means also comprises a truncated bottom 37 comprising a natural recycling tube 38 equipped with a regulating means 39 for regulating the fluid discharge and/or granular material that is recycled through tube 38 to the reaction zone. Regulating means 39 permits a permanent flow of fluid and granular material and/or a sequential or interrupted flow of fluid and granular material.

It has been found that the disembedding of the granular material in the transfer tubes due to the effects of hydropneumatic lamination is insufficient in some cases. As a result, the present invention, as illustrated in FIGS. 5-9 provides a rotatable organ which disembeds the granular material in the decanting means to supplement the action of the disembedding means. The organ is positioned either in tube 38 or in an orifice in truncated bottom 37 at the beginning of tube 38. In addition, means are provided for regulating the speed of rotation of the organ.

Figure 7:
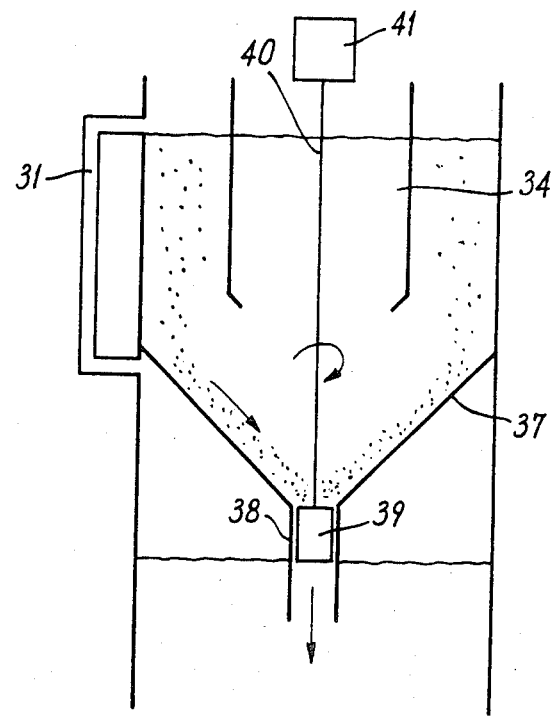
FIG. 7 is a schematic view, partially in cross-section showing an alternative embodiment of the upper part of the reactor.

In the embodiment illustrated in FIG. 7, rotating organ 39 is positioned in tube 38. Organ 39 is fastened to a tree 40 that is caused to rotate by a variable speed motor system 41 at a speed generally between 10 and 200 t/minute. In addition, organ 39 can have a diameter of between approximately 100 and 400 millimeters. Organ 39 can take several diverse forms. In the example shown in FIG. 9, rotating organ 39a is in the form of a screw with one or several threads that extend to the end of organ 39a. In this embodiment tube 38 is provided with a fixed cutting grill which engages organ 39a. Organ 39a pushes back the material on fixed cutting grill 42 in response to rotation of organ 39a.

Figure 8:
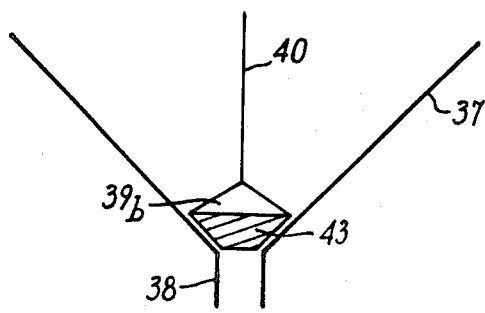
FIG. 8 is a schematic view of an alternative embodiment of the lower part of the reactor of the present invention.
Figure 9:
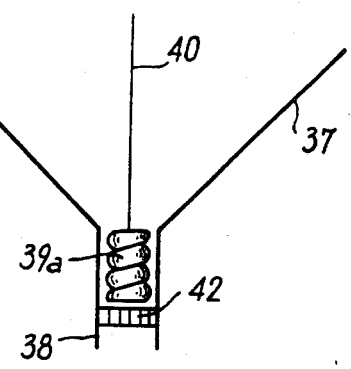
FIG. 9 is a schematic view, partially in cross-section, of another embodiment of the lower part of the reactor of the present invention, showing the decantation zone.

In the embodiment shown in FIG. 8 the rotating organ is positioned at the opening at the beginning of tube 38. The organ comprises a conical wheel 39b, on which helicoidal grooves 43 are positioned.

Regardless of the form taken by organ 39, the presence of this organ, allows, by virtue of its mechanical action which is added to the effects of hydro-pneumatic laminating to which the granulated material is subjected, an efficient disembedding of the granular material. As a result, the organ plays a predominant role in controlling the disembedding of the granular material, thereby regulating the hydraulic discharge of the reactor and the transfer of the granular material to the reaction zone of the apparatus.

Although the invention has been described with respect to particular means, methods and embodiments, the invention is not limited thereto, but extends to all equivalents within the scope of the claims.

What is claimed is:

1. A reactor for aerobically or non-aerobically treating a fluid, wherein said reactor comprises:
   (a) a base comprising means for introducing said fluid into said reactor, and means for adding a gas to said fluid in said reactor thereby converting said fluid into a gasified fluid, wherein said fluid introduction means comprises at least one orifice through which said fluid passes, and at least one substantially horizontally extending plate comprising a supple membrane, wherein said plate and said membrane together comprise a valve;
   (b) means for causing said fluid to flow from a bottom to a top of said reactor;
   (c) a fluidization zone comprising in at least a portion thereof a bed of granular material, wherein said bed of granular material is fluidized in said fluidization zone, whereby when said gasified fluid passes through said bed of granular material a three-phase fluid-gas-granular mixture is formed; and
   (d) an upper portion comprising:
      (i) means for disembedding said granular material entrained by said gas from said three-phase fluid-gas-granular material mixture;
      (ii) means for degasing said three-phase fluid-gas-granular material mixture;
      (iii) means for separating said granular material from said fluid to produce a fluid discharge, wherein said separation means comprises means for recycling said granular material into said fluidization zone and means for decanting said fluid from said granular material; and
      (iv) means for recycling and recuperating a portion of said fluid discharge into said fluidization zone thereby fluidizing said bed of granular material.

2. The reactor defined by claim 1 wherein said reactor further comprises a lower portion comprising said fluid introduction means, said bed of granular material, and said gas adding means.

3. The reactor defined by claim 2 wherein said plate and said membrane are positioned above said base, wherein said membrane and said plate comprise a valve for preventing fluid in said reactor from flowing into said orifice in response to the cessation of fluid flow into said reactor through said orifice.

4. The reactor defined by claim 3 wherein said plate comprises two longitudinal ends and a bottom face, wherein said membrane extends from each longitudinal end of said plate, wherein said orifice faces substantially vertically and substantially perpendicular with respect to said bottom face of said plate, whereby fluid flowing from said orifice into said reactor flows substantially vertically until said fluid contacts said plate, wherein said fluid flows substantially horizontally after contacting said plate.

5. The reactor defined by claim 2 wherein said fluid introduction means comprises:
   an entrance channel comprising:
      a vertically and axially extending neck for guiding said fluid in the substantially vertical direction against said plate, wherein said plate is surrounded by said membrane.

6. The reactor defined by claim 5 wherein said entrance channel further comprises first and second openings therein, wherein said fluid introduction means further comprises a fluid channel adapted to be attached to source of fluid, and passing through said first opening, wherein said reactor further comprises a gas channel attached to a source of gas and passing through said second opening.

7. The reactor defined by claim 5 wherein the diameter of said neck is between 20 and 300 millimeters.

8. The reactor defined by claim 5 wherein said neck comprises a plurality of orifices adapted to receive said as, wherein the diameter of said orifices in said neck is such that said neck comprises means for equally distributing the loss in energy of said gas as said gas passes through said orifices in said neck.

9. The reactor defined by claim 8 wherein the diameter of said orifices is between approximately 30 and 300 millimeters.

10. The reactor defined by claim 5 wherein said membrane is so shaped as to comprise means for ejecting said fluid into said reactor above and to the side of said membrane at a speed of between approximately 1 and 5 meters per second.

11. The reactor defined by claim 2 said granular material has a greater density than water.

12. The reactor defined by claim 11 wherein said granular material has a density of between approximately one and two times the density of water.

13. The reactor defined by claim 12 wherein the diameter of said granular material is between approximately 0.1 and 5 millimeters.

14. The reactor defined by claim 2 wherein said granular material comprises two different granular materials having different dimensions and densities.

15. The reactor defined by claim 2 wherein one end of said fluidization zone is adjacent said disembedding means, wherein one end of said disembedding means is connected to said degasing means, wherein said fluid flows downwardly from said disembedding means into said degasing means, wherein said reactor further comprises:
  a biomass on said granular material; and
  means for producing a speed of said fluid and said granular material in said disembedding means sufficient to eliminate excess biomass on said granular material in said degasing means when said fluid travels downwardly through said degasing means.

16. The reactor defined by claim 2 wherein said reactor further comprises:
  means for producing a speed of said fluid in said fluidization zone of between approximately 2 and 20 m/h;
  means for producing a speed of said fluid and said granular material in said disembedding means of between approximately 0.1 and 1 m/sec;
  means for producing a speed of said fluid in said degasing means of less than 1 cm/second; and
  means for producing a speed of said granular material in said recycling means of between approximately 0 and 2 meters/second.

17. The reactor defined by claim 2 wherein said reactor has a cylindrically shaped upper portion, wherein said disembedding means comprises a tube extending upwardly from said fluidization zone and extending out of said reactor, wherein one end of said tube is connected to said fluidization zone, wherein the other end of said tube is connected to said degasing means, wherein said degasing means comprises a first chamber in said reactor, wherein said reactor further comprises a first partition separating said first chamber from said fluidization zone, wherein said first chamber is taller than the level of fluid therein, wherein said degasing means further comprises a tube at the top of said first chamber for carrying off said gas separated from said fluid in said first chamber, wherein said tube in said first chamber is connected to said gas adding means, wherein said first partition is slanted downwardly from one side of said reactor, wherein said reactor further comprises a second partition and a second cylindrical coaxial chamber, coaxial with said cylindrically shaped upper portion of said reactor, wherein said second partition separates said first chamber from said second cylindrical coaxial chamber, wherein said second chamber is positioned substantially in the center of said reactor, wherein said second chamber comprises said separation means, wherein said reactor further comprises a funnel-shaped element and a discharge tube for carrying said discharged fluid out of said reactor, wherein said funnel shaped element is positioned at one end of said tube in approximately the center of said second chamber substantially above the bottom of said second partition, wherein said second chamber comprises a decantation enclosure comprising a bottom portion comprising a recycling tube extending downwardly from said decantation enclosure and comprising said recycling means.

18. The reactor defined by claim 2 wherein fluid introduction means comprises a plurality of injection necks mounted on said plate, wherein fluid is injected into said reactor through said neck, wherein said reactor further comprises a plurality of gas collectors positioned above said plate, wherein said plurality of gas collectors each comprise a plurality of orifices for the diffusion of said gas, wherein each gas collector is associated with one of said injection necks.

19. The reactor defined by claim 18 in combination with said gas, wherein said gas comprises a material selected from the group consisting of: air, oxygen, and oxygen enriched air.

20. The reactor defined by claim 2 wherein said fluid introduction means comprises a plurality of nozzles comprising means for equally distributing said fluid in said reactor, wherein each nozzle comprises an orifice for producing a jet of said liquid directed at said plate, wherein said reactor further comprises a bottom wall comprising said plate, wherein said membrane comprises a ballasted supple membrane comprising said valve, wherein said reactor further comprises a plurality of air diffusing devices, each of which are associated with one of said nozzles, wherein each air diffusing device comprises an air tank positioned under said associated injection nozzle, wherein each tank comprises a plurality of orifices comprising means for distributing said air equally in said reactor, wherein each tank further comprises a plurality of supple membranes, each of which surrounds one of said orifices and each of which comprises a material selected from the group consisting of: perforated material and porous material.

21. The reactor defined by claim 20 wherein said orifices of said nozzles have a diameter between approximately 20 and 100 millimeters.

22. The reactor defined by claim 2 wherein said disembedding means comprises:
  a regulatable diaphragm; and
  one of the following:
    at least one interior transfer tube inside said reactor; and
    at least one exterior transfer tube extending outside said reactor, wherein said disembedding means comprises means for producing a fluid flow in said disembedding means of between approximately 0.1 and 1 meters per second.

23. The reactor defined by claim 2 wherein said degasing means comprises one of the following:
  at least one central enclosure extending through the center of said reactor; and
  at least one lateral enclosure,
  wherein said degasing means comprises means for producing a descending hydraulic flow of between approximately 0.3 and 5 centimeters per second.

24. The reactor defined by claim 2 wherein said reactor further comprises a reaction zone in which said fluid mixes with said granular material and said gas, wherein said separation and decanting means comprises:
  a lower portion comprising a truncated bottom having a cross-sectional area between approximately 0.5 and 3 times the cross-sectional area of said degasing means, wherein said truncated bottom comprises at least one tube for recycling said granular material into said reaction zone; and
  an upper portion comprising one of the following:
    at least one central enclosure extending through the center of said reactor; and
    at least one lateral enclosure.

25. The reactor defined by claim 24 wherein said gas adding by said gas added means causes a gas-lift effect in said reaction zone and in said degasing means, wherein said tube of said lower portion of said separation and decanting means further comprises means for conveying at least a portion of said fluid discharge for fluidization of said granular material in response to said gas-lift effect in said reaction zone and in said degasing means, wherein said portion of said fluid discharge comprises a recycling discharge, wherein said reactor further comprises means for controlling said recycling discharge, wherein said control means comprises means for permitting a permanent flow of said recycling discharge and for permitting a sequential interrupted flow of said recycling discharge.

26. The reactor defined by claim 25 wherein said separating and decanting means comprises a decantation zone in which decantation of said granular material and said fluid occurs, wherein said tube comprises an opening therein, wherein said reactor further comprises a rotatable organ whose speed of rotation is adapted to be regulated, wherein said organ is positioned in one of following locations:
   in said opening in said tube; and
   in the interior of said tube, whereby said organ comprises means for reinforcing the disembedding of said granular material in said disembedding means and for controlling the flow of said recycling discharge at the bottom of said decantation zone and the recycling of said granular material in said reaction zone.

27. The reactor defined by claim 26 wherein said organ positioned in said tube has a generally cylindrical shape.

28. The reactor defined by claim 26 wherein said organ in said tube has substantially the shape of a screw having threads which extend to the end of said screw, wherein said reactor further comprises a cutting grill positioned in said tube and adapted to engage said organ.

29. The reactor defined by claim 26 wherein said organ positioned in said opening of said tube comprises a substantially conical wheel having at least one helicoidal groove thereon.

30. The reactor defined by claim 29 wherein said wheel comprises a plurality of helicoidal grooves thereon.

31. The reactor defined by claim 26 further comprising means for rotating said organ between approximately 10 and 200 t/minute.

32. The reactor defined by claim 26 wherein said organ has a diameter of approximately between 100 and 400 millimeters.

* * * * *

UNITED STATES PATENT AND TRADEMARK OFFICE
CERTIFICATE OF CORRECTION

PATENT NO. : 4,707,252

DATED : November 17, 1987

INVENTOR(S) : Jean DUROT et al.

It is certified that error appears in the above-identified patent and that said Letters Patent is hereby corrected as shown below:

At column 1, line 20, change "field" to ---fluid---.

At column 1, line 63, change "recycling" to ---recycle---.

At column 5, line 17, insert ---the--- after "of" and before "following".

At column 6, line 47, change "rector" to ---reactor---.

At column 7, line 8, insert ---of--- after "number" and before "points".

At column 7, line 64, change "fo" to ---of---.

At page 7, bottom line, insert "whether" after "upon" and before "the".

At column 8, line 39, insert ---,--- after "bed" and before "a".

At column 9, line 7, delete "or" (third occurrence).

At column 10, line 22, insert ---,--- after "mixture".

At column 10, line 33, insert ---of--- after "number" and before "channels".

At column 11, line 3, change "hydropneumatic" to ---hydro-pneumatic---.

At column 11, line 30, delete "," after "organ" and before "allows".

At column 12, line 49, i.e., at claim 8, line 3, change "as" to ---gas---.

UNITED STATES PATENT AND TRADEMARK OFFICE
CERTIFICATE OF CORRECTION

PATENT NO. : 4,707,252

DATED : November 17, 1987

INVENTOR(S) : Jean DUROT et al.

It is certified that error appears in the above-identified patent and that said Letters Patent is hereby corrected as shown below:

At column 12, line 61, i.e., at claim 11, line 1, change "wherein 2" to ---2 wherein---.

At column 15, line 18, i.e., at claim 26, line 7, insert ---the--- after "of".

Signed and Sealed this

Twenty-third Day of July, 1991

Attest:

HARRY F. MANBECK, JR.

Attesting Officer     Commissioner of Patents and Trademarks